United States Patent [19]
Seed

[11] Patent Number: 5,683,070
[45] Date of Patent: Nov. 4, 1997

[54] MEANS FOR ATTACHING ACCESSORIES TO VIDEO DISPLAY TERMINAL

[76] Inventor: Paul Seed, 67 Doncaster Avenue, London, Ontario, Canada, N6A 5G5

[21] Appl. No.: 594,562

[22] Filed: Jan. 31, 1996

[30] Foreign Application Priority Data

Dec. 12, 1995 [CA] Canada .................. 2165010

[51] Int. Cl.⁶ .................. A47G 1/16; B41J 11/02
[52] U.S. Cl. .................. 248/442.2; 248/918
[58] Field of Search .................. 248/918, 442.2, 248/220.22, 223.41, 224.51, 224.61, 224.7, 225.11, 295.11, 297.21

[56] References Cited

U.S. PATENT DOCUMENTS

| | | |
|---|---|---|
| D. 309,603 | 7/1990 | Mizusugi et al. . |
| 4,475,705 | 10/1984 | Henneberg . |
| 4,619,429 | 10/1986 | Mazza . |
| 4,632,471 | 12/1986 | Visnapov . |
| 4,693,443 | 9/1987 | Drain . |
| 4,869,565 | 9/1989 | Bachman . |
| 4,902,078 | 2/1990 | Judd . |
| 4,946,121 | 8/1990 | Troke . |
| 4,960,257 | 10/1990 | Waters . |
| 5,035,392 | 7/1991 | Gross et al. . |
| 5,078,358 | 1/1992 | Egly et al. . |
| 5,082,235 | 1/1992 | Crowther . |
| 5,104,087 | 4/1992 | Wentzloff et al. . |
| 5,104,088 | 4/1992 | Bakanowsky, III . |
| 5,125,612 | 6/1992 | McNeal . |
| 5,190,258 | 3/1993 | Yo . |
| 5,267,658 | 12/1993 | Schwenk et al. .............. 248/295.11 X |
| 5,292,099 | 3/1994 | Isham et al. . |
| 5,320,328 | 6/1994 | Chen . |
| 5,328,145 | 7/1994 | Charapich . |
| 5,351,929 | 10/1994 | Vallance .......................... 248/225.11 X |
| 5,385,327 | 1/1995 | Hegarty et al. ...................... 248/918 X |
| 5,398,905 | 3/1995 | Hinson . |
| 5,400,408 | 3/1995 | Lundgren et al. . |
| 5,526,180 | 6/1996 | Rausnitz ............................. 248/918 X |
| 5,549,268 | 8/1996 | Hopwood ............................ 248/442.2 |
| 5,615,854 | 4/1997 | Nomura et al. ...................... 248/287.1 |

Primary Examiner—Ramon O. Ramirez
Assistant Examiner—Stephen S. Wentsler
Attorney, Agent, or Firm—Henderson & Sturm

[57] ABSTRACT

A system is provided for securing an accessory or a bracket to a video display terminal. The system includes a partial or complete peripheral grooved channel, in the side edges and the top edges of a rectangular framework which is of substantially the same dimensions as the front face dimension of the video display terminal and which is adapted to be secured to the front face of the video display terminal. The accessory or a bracket to which the accessory may be attached, is provided with specifically-recited securing structure for cooperation with the grooved channel. The accessory is thus secured to the video display terminal, by specifically-recited structural cooperation between the accessory or the bracket and the rectangular framework.

6 Claims, 3 Drawing Sheets

MEANS FOR ATTACHING ACCESSORIES TO VIDEO DISPLAY TERMINAL

BACKGROUND OF THE INVENTION

(a) Field of the Invention

This invention relates to a means to enable items, e.g., speakers, accessories, etc., to be attached to the video display terminal of a computer.

For the purpose of this invention, the term "video display terminal" (VDT) is used to describe a video display screen connected to a micro-computer which includes a separate box containing computer hardware, e.g., a central processing unit (CPU), and disk drive; or describes a video display screen connected to a micro-computer in which the CPU and disk drive are built into a single unit; or to a "dumb" terminal in which the video display screen is one of multiple screens electrically connected to a shared CPU.

(b) Description of the Prior Art

Multimedia personal computers are available which include not only a VDT for visual displays, but also speakers for an audio output which may be synchronized to the visual output. In an optimum configuration, a pair of speakers is provided, with one on each side of the VDT. These have traditionally been mounted on supports so that their respective positions can be adjusted to give the best audio reception for an operator sitting before the VDT and keyboard of the computer. A problem existed, however, in attempting to mount such speakers securely to the VDT.

In the realm of providing speaker attachments to a VDT, U.S. Pat. Nos. 5,190,258 and 5,400,408 provided different solutions to the problem of providing supports for an audio amplifier housing. On the one hand, U.S. Pat. No. 5,190,258, patented Mar. 2, 1993 by C. C. Yo, provided an articulated support assembly for audio speakers. It included a frame, and a post on the frame having a longitudinal axis. A first arm was pivotable about the post in a first plane between a retracted position on the frame and a first angularly extended position. Slide means were provided for translating the first arm longitudinally with respect to the post when the first arm was in its angularly-extended position. A second arm was pivotable on the first arm about an axis which was perpendicular to the post axis in a second plane different from the first plane between a retracted position coplanar with the first arm and a second angularly-extended position. Thus, that patent purported to provide an articulated support assembly for such audio speakers which was retractable into a recess in the housing of one of the computer components, e.g., an amplifier.

On the other hand, U.S. Pat. No. 5,400,408, patented Mar. 21, 1995 by D. A. Lundgren et at, provided a stereophonic sound enclosure system. The enclosure was used in conjunction with a VDT including an aperture grill having a first natural frequency substantially within a musical bandwidth. The monitor was coupled to receive a plurality of video and audio signals from a central processor unit within a digital information processing system. The hollow body subtended an enclosed volume and was in the form of a rigid unit including a first plurality of intersecting rib members for resisting deformation of the hollow body. An audio speaker arrangement was affixed to the hollow body, the audio speaker arrangement being coupled to receive the audio signals and generating in response thereto a plurality of sound waves. A tuned port was formed within the hollow body which had a second natural frequency less than the first natural frequency of the aperture grill. A band of selected low frequency sound waves was broadcast from the hollow body. A plurality of vibration isolation members was seated on a corresponding plurality of isolation-mounting surfaces formed in the hollow body and compressively-disposed between the hollow body and the monitor when the hollow body was mounted within the monitor. Vibration isolation members were provided which had a third natural frequency substantially equivalent to the second natural frequency. The audio speaker arrangement was substantially vibrationally isolated from the aperture grill. This did not provide an external mounting for speakers on a VDT.

The patent literature also provided some attempted solutions to the problems of attaching a document holder to a VDT. Examples are the following:

U.S. Pat. No. 4,475,705, which issued Oct. 9, 1984 to H. H. Henneberg, provided a document holder which was attachable to a VDT to support one or more documents. The document holder was supported by an easel bracket which fit in an annular groove which was preferably formed in the VDT slightly behind the plane of the screen.

U.S. Pat. No. 4,619,429, which issued Oct. 28, 1986 to L. S. Mazza, provided a copy holder assembly which was mountable onto the VDT of a data processing work station. The copy holder included correspondence boards and a memo board which were coupled to a harness assembly. The harness assembly included an elastic strap, first and second hinge assemblies and a cross bar. The elastic strap was lashed around the cabinet bottom and tensioned the hinge assemblies into compressive engagement with the VDT.

U.S. Pat. No. 4,632,471, which issued Dec. 30, 1986 to A. H. Visnapov, provided a copyholder assembly for use with a VDT. The copyholder assembly included a display framing panel which was secured to the front of the VDT, and a copyholding panel which extended from a respective side of the display framing panel. The panels were joined, either integrally, or for pivotal angular adjustment of the copyholding panel relative to the display framing panel. The display framing panel, which included a window which was positionable in front of the VDT, was adjustably detachably secured to a mounting assembly. That mounting assembly was removably securable atop the monitor or to a mount, which itself was removably securable beneath the monitor.

U.S. Pat. No. 4,693,443, which issued Sep. 15, 1987 to J. M. Drain provided a holder for sheet material. The holder was secured to the VDT by means of a hinged mounting. The hinged mounting included a mounting member which was secured to the VDT by a double-faced adhesive tape. The mounting member included a cylinder/pin arrangement including an arm which supported the holder.

U.S. Pat. No. 4,869,565, which issued Sep. 26, 1989 to C. S. Bachman, provided a universally-adjustable display apparatus for fitment about, and affixation to, the housing of a VDT. The display apparatus was secured to the side faces of the VDT housing by means of adhesive.

U.S. Pat. No. 4,902,078, which issued Feb. 20, 1990 to T. W. Judd, provided a document holder clip which included a right angle support bracket. The support bracket was secured to the side of the VDT by means of hook-and-loop type fastener which was fastened to the bracket support, and VELCRO™ hook-and-loop type fastener which was glued to the monitor screen case. An extending arm was pivotally engaged with the support bracket and a document holder clip was adaptable for slidable movement on the upper edge of the extending arm.

U.S. Pat. No. 4,960,257, which issued Oct. 2, 1990 to D. F. Waters, provided a document easel for use with a VDT. It included a generally-L-shaped bracket and a generally-U- shaped member which was removably attached to the VDT. The generally-L-shaped bracket was attached to the VDT by means of a pair of cooperating adhesive strips.

U.S. Pat. No. 5,078,358, which issued Jan. 7, 1992 to R. A. Egly et al, provided a copy holder having a slotted beam which was sized to accommodate paper copy. A paper back support was hinged to the slotted beam. That slotted beam was pivotally-mounted to a support bracket which was itself slidably received in a mounting bracket. The mounting bracket was adhered to the top of the VDT.

U.S. Pat. No. 5,082,235, which issued Jan. 21, 1992 to D. A. Crowther, et al, provided a document holder for mounting on opposite sides of a VDT. The mounting was by way of clamps which gripped the exterior opposite side faces of the VDT and included a locking adjustable feature.

U.S. Pat. No. 5,104,087, which issued Apr. 14, 1992 to D. L. Wentzloff et al, provided a note/memo board which was particularly constructed to be associated with an information display device. The note/memo board was provided with an opening for receiving a housing of the information device. The housing was provided with strips of VELCRO™ hook-and-loop-fastener which were engaged by other strips of VELCRO™ hook-and-loop-fastener which were carried by a leg of an angle bracket which was adjustably secured to the rear surface of the note/memo board. Thus, the housing was secured to the outer perimeter of the VDT by cooperating VELCRO™ strips.

U.S. Pat. No. 5,104,088, which issued Apr. 14, 1992 to L. J. Bakanowsky (III), provided a document holder clip which included a right angle support bracket was secured to the side of a VDT by two cooperating VELCRO™ hook-and-loop type fastener strips.

U.S. Pat. No. 5,125,612, which issued Jun. 30, 1992 to D. R. McNeal, provided a bracket for a VDT. The bracket was affixed to the VDT and held work-sheets for the terminal operator. The bracket was secured both to the top and one side face of the VDT by cooperating VELCRO™ strips.

U.S. Pat. No. 5,292,099, patented Mar. 8, 1994 by W. R. Isham et at, provided a display mounted document holder, which was clamped to a VDT, with a lo document platen either on the right side or on the left side, or on both sides. The document holder was secured to the VDT by means of a U-shaped clamp for compressively gripping the sides and top of the VDT.

In the field of attaching other accessories to a VDT, the prior art is replete with add-ons which were not aesthetically pleasing, since they involved brackets which were secured to the VDT. Among these patents are:

U.S. Pat. No. 4,946,121, which issued Aug. 7, 1990 to J. T. Troke, provided a bracket accessory for mounting on a VDT for temporary storage of a keyboard. Each bracket had a pair of fingers which defined a bight. A pair of such brackets was mounted on a VDT so that the bights were located above the VDT and o opened upwardly and were aligned horizontally. The brackets were attached to the VDT using double-faced pressure-sensitive adhesive tape.

U.S. Pat. No. 5,035,392, patented Jul. 30, 1991 by C. Gross et at, provided an attachment mechanism for mounting a display board on either or both sides of a VDT. Each such display board was pivotable around both horizontal and vertical axes to provide maximum comfort for the VDT operator. The holder was secured to the VDT by means of a base plate which was secured to two corner shoulders.

U.S. Pat. No. 5,320,328, patented Jun. 14, 1994 by T-S Chen, provided a filter screen mounting device for a VDT which included a mounting block. The mounting block was secured to the top of the VDT by means of VELCRO™ hook-and-loop-type-fastener or by means of a self-sticking pad.

U.S. Pat. No. 5,328,145, patented Jul. 12, 1994 by D. R. Charapich, provided a mounting board for a VDT housing which was a planar sheet having an opening for viewing the VDT in one portion. The mounting board was attached to the VDT housing by stabilizers. The stabilizers were secured to the VDT frame by means of double-faced adhesive tape.

U.S. Pat. No. 5,398,905, patented Mar. 21, 1995 by L. A. Hinson, provided a die-cut display board for a VDT. The display board included a top screen housing tab and a side screen housing tab. Such tabs were fastened to the VDT by double-sided adhesive tape, or by VELCRO™ hook-and-loop-type-fastener.

Of the prior patents discussed above, U.S. Pat. No. 4,475,705 seems the most relevant in that it teaches a bracket which is complementary to the width and shape of an annular groove which is formed in the top of the VDT between the cover and the bezel.

SUMMARY OF THE INVENTION

(a) Aims of the Invention

Accordingly, the present invention has for its principal object, the provision of cooperative elements associated with a VDT to allow easy addition and removal of a wide variety of items thereto.

Another object of this invention is to provide such elements which are as inconspicuous and aesthetically pleasing as possible.

A further object of the present invention is to provide a mounting structure for slidingly receiving and securing a holder in place for removably retaining items at desired locations on the VDT.

It is yet another object of the present invention to provide such cooperative elements whereby the items can be mounted to the VDT without requiting any tools and with minimum effort.

Yet another object of the invention is to provide such cooperative elements whereby the items can be quickly installed onto a VDT and which can be easily removed.

(b) Statement of Invention

According to this invention, an accessory may be secured to a video display terminal by means of a partial or complete peripheral grooved channel which is operatively associated with the side edges and the top edge of the video display terminal. An element is provided which has a complementary flange defining a groove for securing cooperation within the partial or complete peripheral grooved channel. The accessory is secured, either directly or indirectly, to the video display terminal by securing cooperation between the partial or complete peripheral grooved channel and the flange defining the complementary groove.

Thus, by this invention, means are provided for securing an accessory to a video display terminal such means comprising: a rectangular framework which is complementary to the video display terminal and which is of substantially the same dimensions as the front face dimension of the video display terminal for securement to the front face of the video display terminal, the framework including a partial or complete peripheral grooved channel within the side edges and the top edge of the rectangular framework, the peripheral grooved channel being bounded by an inner peripheral surface of a front face portion of the rectangular framework, and an inner peripheral surface of a forward projection from a rear portion of the rectangular framework, and an accessory or a bracket, the accessory or bracket essentially including a complementary securing means, the complementary securing means comprising both a lateral flange having substantially the same thickness as the width of the peripheral grooved channel of the rectangular framework, and an adjacent complementary channel, the complementary channel being of substantially the same width as the thickness of the forward projection from the rear portion of the rectangular framework, whereby the accessory or the bracket is secured to the video display terminal by securing cooperation both between the peripheral partial or complete grooved channel of the rectangular framework and the lateral flange of the accessory or the bracket, and between the adjacent complementary channel of the accessory or the bracket and the forward projection of the rear portion of the rectangular framework.

(c) Other Features of the Invention

By one feature of this invention, the framework includes a stepped larger rear portion, the stepped larger rear portion including a partial or complete peripheral area which surrounds a forward portion which is provided with the partial or complete peripheral grooved channel.

By another feature of this invention, at least one face of the partial or complete peripheral grooved channel is provided with frictional gripping surfaces, e.g., where the frictional gripping surfaces are upstanding from the base of the partial or complete peripheral grooved channel.

By still another feature of this invention, the bracket has means thereon for the securement of the accessory thereto.

By a still further feature of this invention, an anti-glare filter is secured to the front of the rectangular framework.

(d) Generalized Description of the Invention

The present invention thus provides a system for attaching accessories to a VDT. In one embodiment, the system includes a partial or complete peripheral frame having two sides and an upper wall extending perpendicularly therefrom. The front of the frame may be fitted with an anti-glare filter. The side panels of the frame are provided with partial or complete peripheral female grooved channels. The frame is adapted to be secured by interior adhesion means to the front face of the VDT, so as to provide a partial or complete peripheral female channel having frictional gripping surfaces on one face thereof between the frame and the VDT. In another embodiment, the VDT box itself is provided with partial or complete peripheral grooved channels, along the side edges and the top edge thereof. Either a bracket, or the accessory itself, has a complementary flange defining a grooved male channel which is adapted to be fitted into the partial or complete peripheral female grooved channel, to be gripped by the partial or complete peripheral female grooved channel and by its associated frictional gripping surfaces. If the brackets are used, the bracket are further provided with means cooperating with the accessory to hold the accessory to the VDT.

BRIEF DESCRIPTION OF THE DRAWINGS

In the accompanying drawings.

Figure 1:
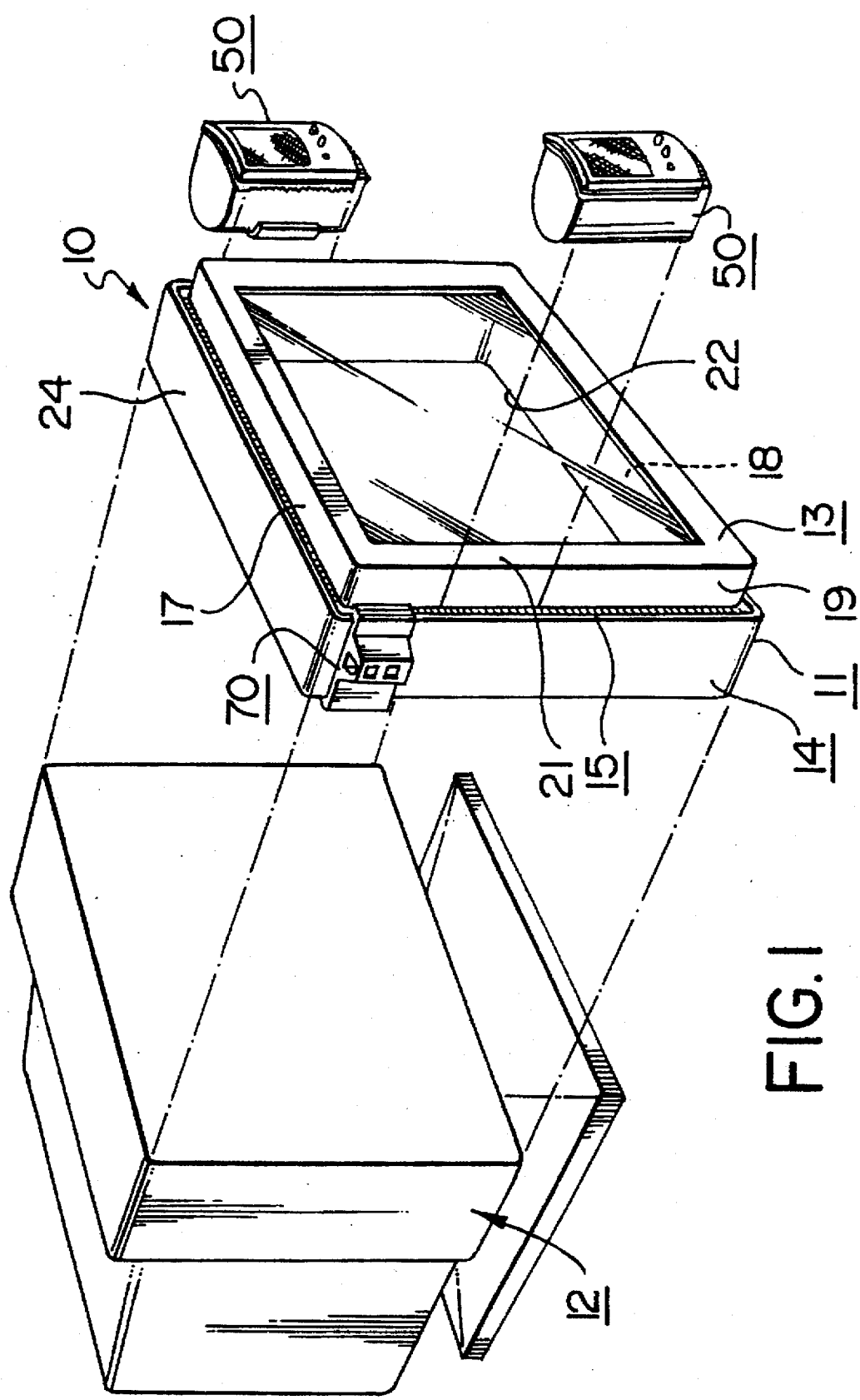
FIG. 1 is an exploded front perspective view of the system of one embodiment of this invention associated with the video display terminal, which is shown in block schematic form.
Figure 2:
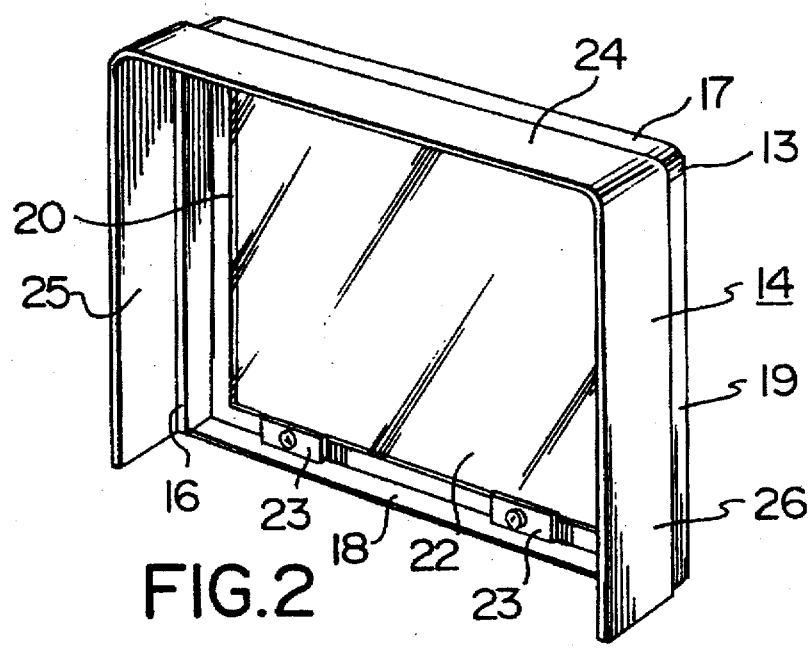
FIG. 2 is a rear perspective view of the assembled system of one embodiment of this invention.

DESCRIPTION OF PREFERRED EMBODIMENTS OF THE INVENTION (a) Description of FIGS. 1 and 2

As seen in FIGS. 1 and 2, the system 10 of this embodiment of the invention is in the form of a box-like frame 11. As seen in FIG. 1, the frame is adapted to be secured by interior conventional means, e.g., by double-faced adhesive tape or by VELCRO™ (not seen) to a video display terminal box 12 (shown in schematic form).

As seen in FIGS. 1 and 2, the box-like frame 11 includes a front face portion 13 and a rear portion 14, which is slightly larger and which defines a partial peripheral space 15 between front face portion 13 and rear portion 14. The partial peripheral space 15 includes a backing block 16 (seen in FIG. 2).

Front face portion 13 includes a peripheral frame defined by a pair of parallel upper and lower plates 17,18 and a pair of parallel uprights 19,20. A facia defined by enclosing open rectangular framework 21 is provided at the lateral edge of plates 17,18 and uprights 19,20. It is preferred that an anti-glare filter 22 be provided within the open framework 21, which is held in place by clasps 23 (seen in FIG. 2)

Rear portion 14 includes a partial peripheral frame defined by an upper plate 24 and a pair of parallel uprights 25,26. The partial peripheral space 15 between face portion 13 and rear portion 14 is provided with a partial peripheral female grooved channel 27 which is seen more clearly in FIGS. 3, 4 and 5.

Figures 3, 4:
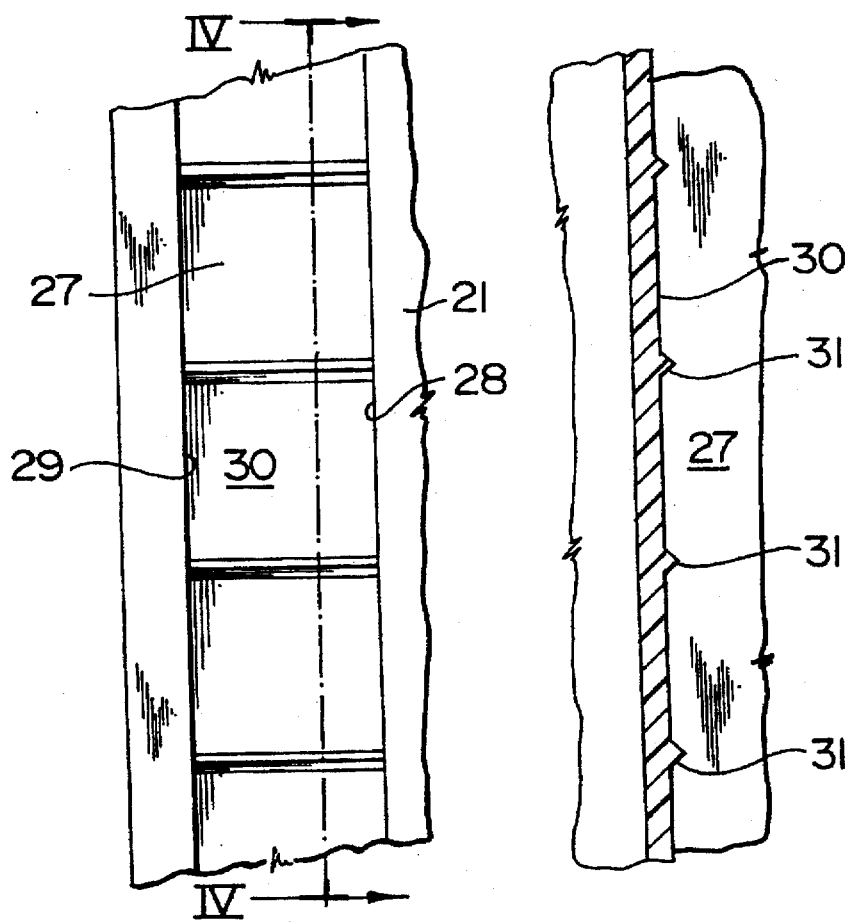
FIG. 3 is a front elevational view of the peripheral female channel of the system of an embodiment of this invention.
FIG. 4 is a section through line IV—IV of FIG. 3.

(b) Description of FIGS. 3 and 4

As seen more clearly in FIGS. 3 and 4, the partial peripheral female grooved channel 27 is defined at its outer lateral edge by an inner partial peripheral surface 29, defined by the front edges of upper plate 24 and uprights 25,26, and at its limiting inner edge by partial peripheral surfaces 29 defined by plate 24 and uprights 19,20 of the front face portion 13. The partial peripheral female grooved channel 27 includes a partial peripheral base 30, provided with a plurality of parallel, upstanding, friction-enhancing, projecting surfaces 31.

Figure 5:
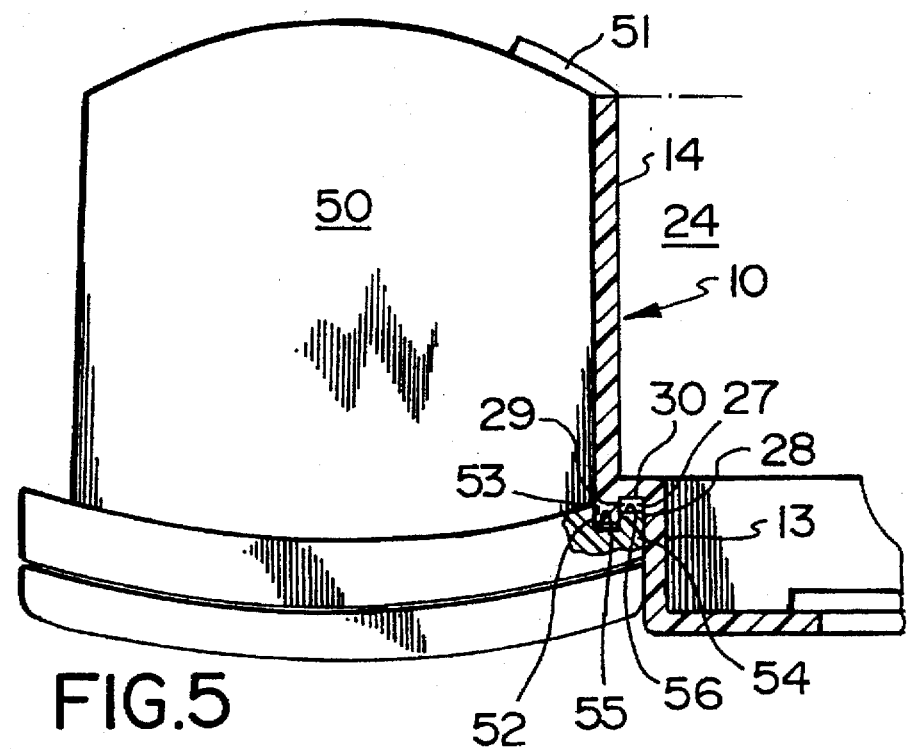
FIG. 5 is a top plan view of a speaker attached to the video display terminal provided with the system of an embodiment of this invention.

(c) Description of FIG. 5

FIG. 5 shows an accessory 50 (e.g., a speaker) secured to one embodiment of the system 10 of this invention. As noted before, the partial peripheral female channel 27 is defined by inner and outer lateral edges 28,29 and has a base 30 provided with upstanding friction enhancing surfaces 31. The rectangular framework 10 also includes a forward projection 52 extending forwardly from the rear portion 14 thereof.

The speaker 50 includes a rear bracket 51 and a forward lateral complementary flange 54. The speaker 50 also includes and adjacent complementary channel. 55 which isprovided between partial peripheral face and lateral flange 54. The projecting face of lateral flange 54 is provided with a plurality of parallel indentations 56 which are preferably complementary to projecting surfaces 31.

Figure 6:
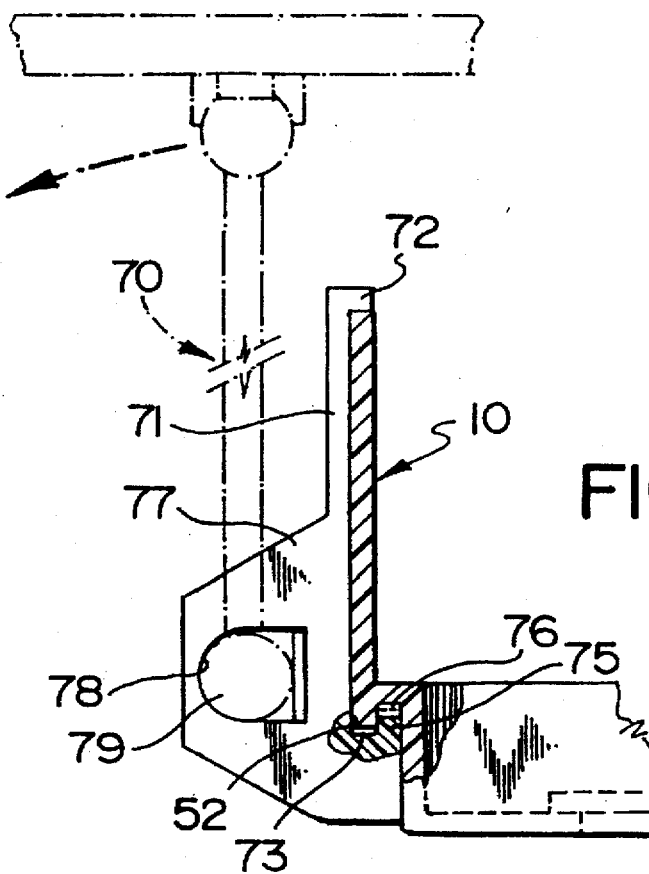
FIG. 6 is a top plan view of a bracket attached to the video display terminal provided with the system of an embodiment of this invention.

(d) Description of FIG. 6

As seen in FIG. 6, a bracket 70 may also be secured to one embodiment of the system 10 of this invention. The bracket 70 has a main rectangular base 71. The base 71 includes a rear flange 72 and a forward lateral flange 75. The bracket 70 also includes an adjacent complementary channel 73 within which the forward projection 52 of the rear portion 14 of the rectangular framework 10 fits. Likewise, flange 75 fits into channel 27, which is provided in the rectangular framework 10(see FIG. 5). The projecting face of flange 75 is provided with a plurality of parallel indentations 76, which preferably are complementary to the friction enhancing surfaces 31 projecting from the base 30.

Base 71 includes a projecting bushing 77, which includes a hollow cylindrical core 78 therethrough. This core 78 supports the cylindrical shaft 79 of a desired accessory.

Operation of Preferred Embodiments of the Invention (a) Operation of FIGS. 1 and 2

In the operation of the invention, the apparatus 10 is secured to the front face of the video display terminal 12, as seen in FIG. 1.

(b) Operation of FIG. 5

In the operation of this embodiment of the invention, if a speaker 50 is to be secured to a side of the video display terminal 12, the speaker is secured by first placing the complementary lateral flange of the accessory into the partial peripheral female channel of the rectangular framework, and to place the forward projection of the rear portion of the rectangular framework into the adjacent complementary channel of the accessory to provide the cooperation shown in FIG. 5. The rear bracket is then secured by friction against the rear face of the rear portion of the system of embodiments of this invention. It is preferred that the complementary cut-outs mate with the projections.

Operation of FIG. 6

In the operation of this embodiment of the invention, if a bracket 70 is to be secured to a side of the video display terminal 12, the bracket is secured by simultaneously placing the flange 75 of the bracket 70 into the channel 27 in the rectangular framework 10, and the forward projection 52 of the rear portion 14 of the rectangular framework 10 into the complementary channel 73 of the bracket 70. The bracket 70 is secured in place by friction between the rear flange 72 of the bracket 70 and an end face of the rear portion 14 of the rectangular framework 10. It is preferred that the complementary cut-outs mate with the projection. A suitable accessory, also as shown in FIG. 6, may then be attached.

Conclusion

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and "intended" to be, within the full range of equivalence of the following claims.

I claim:

1. A mount apparatus for a video display terminal having a front face, comprising in combination:

a rectangular framework which is complementary to said video display terminal and which is of substantially the same dimensions as the dimensions of said front face of said video display terminal for securement to said front face of said video display terminal, said framework including a partial or complete peripheral grooved channel which is within side edges and which is within a top edge of said rectangular framework, said partial or complete peripheral grooved channel being bounded by an inner peripheral surface of a front face portion of said rectangular framework, and an inner peripheral surface of a forward projection from a rear portion of said rectangular framework; and an accessory or a bracket, said accessory or bracket essentially including a complementary securing means, said complementary securing means comprising both a lateral flange having substantially the same thickness as the width of said peripheral grooved channel of said rectangular framework, and an adjacent complementary channel, said adjacent complementary channel being of substantially the same width as the thickness of said forward projection from said rear portion of said rectangular framework;

whereby said accessory or said bracket is secured to said video display terminal by securing cooperation both between said peripheral partial or complete grooved channel of said rectangular framework and said lateral flange of said accessory or of said bracket, and between said adjacent complementary channel of said accessory or said bracket and said forward projection of said rear portion of said rectangular framework.

2. The means of claim 1 wherein said framework includes a stepped larger rear portion, said stepped larger rear portion including said forward projection which surrounds said partial or complete peripheral grooved channel.

3. The means of claim 1, wherein at least one face of said partial or complete peripheral grooved channel is provided with frictional gripping surfaces.

4. The means of claim 3, wherein said frictional gripping surfaces are upstanding from a base of said partial or complete peripheral grooved channel.

5. The means of claim 1, wherein said bracket has means thereon for the securement of an accessory thereto.

6. The means of claim 1, including an anti-glare filter which is secured to a front face of said rectangular framework.

* * * * *